US008665399B2

(12) United States Patent
Wang et al.

(10) Patent No.: US 8,665,399 B2
(45) Date of Patent: Mar. 4, 2014

(54) LIGHT OUTPUT DEVICE AND CONTROL METHOD

(75) Inventors: Lingli Wang, Bad Kreuznach (DE); Dirk Kornelis Gerhardus De Boer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 940 days.

(21) Appl. No.: 12/595,639

(22) PCT Filed: Apr. 11, 2008

(86) PCT No.: PCT/IB2008/051380
§ 371 (c)(1),
(2), (4) Date: Oct. 13, 2009

(87) PCT Pub. No.: WO2008/129438
PCT Pub. Date: Oct. 30, 2008

(65) Prior Publication Data
US 2010/0060821 A1    Mar. 11, 2010

(30) Foreign Application Priority Data
Apr. 19, 2007    (EP) .................................... 07106486

(51) Int. Cl.
*G02F 1/1335*    (2006.01)
(52) U.S. Cl.
USPC ............................................. 349/69; 349/62

(58) Field of Classification Search
USPC .................................. 349/61–65, 69; 362/612
See application file for complete search history.

(56) References Cited

U.S. PATENT DOCUMENTS

| 6,871,982 B2 * | 3/2005 | Holman et al. ................. 362/331 |
| 2004/0218248 A1 | 11/2004 | De Bougrenet De La Tocnaye et al. |
| 2005/0233125 A1 | 10/2005 | Anderson et al. |
| 2006/0077693 A1 * | 4/2006 | Ko et al. ......................... 362/633 |
| 2006/0092348 A1 * | 5/2006 | Park ................................. 349/64 |

FOREIGN PATENT DOCUMENTS

| WO | 2005121641 A1 | 12/2005 |
| WO | 2006043196 A1 | 4/2006 |
| WO | 2007007235 A2 | 1/2007 |

* cited by examiner

*Primary Examiner* — Edward Glick
*Assistant Examiner* — David Chung
(74) *Attorney, Agent, or Firm* — Mark L. Beloborodov

(57) ABSTRACT

The present invention relates to a light output device (10) comprising a plurality of light source units (18) arranged in a laminated glass structure. The light output device is characterized by a plurality of switchable liquid crystal-based (24) devices arranged to alter the beam shapes of light emitted by the light source units when in a beam shape altering mode. The present invention also relates to a method for controlling a light output device.

3 Claims, 2 Drawing Sheets

LIGHT OUTPUT DEVICE AND CONTROL METHOD

FIELD OF THE INVENTION

The present invention relates to a light output device comprising a plurality of light source units arranged in laminated glass. The present invention also relates to a method for controlling a light output device.

BACKGROUND OF THE INVENTION

Laminated glass is typically manufactured by permanently bonding two or more lites or plates of glass with an interlayer, for instance polyvinylburtyal (PVB), under heat and pressure, to create a single structure.

Laminated glass can be used in a variety of applications. It can for instance be used in light output devices, wherein light emitting diodes (LEDs) are embedded in the laminated glass structure.

However, a problem in such devices is that the output beam shapes are static, that is, the light emitted from the LEDs of the device have a predetermined collimation or dispersion, limiting the versatility and applicability of the light output device.

SUMMARY OF THE INVENTION

It is an object of the present invention to at least partly overcome this problem, and to provide an improved light output device, in particular a light output device with dynamic light.

This and other objects that will be apparent from the following summary and description is achieved by a light output device, and a method for controlling a light output device, according to the appended claims.

According to an aspect of the present invention, there is provided a light output device comprising a plurality of light source units arranged in a laminated glass structure, characterized by a plurality of switchable liquid crystal-based devices arranged to alter the beam shapes of light emitted by the light source units when in a beam shape altering mode.

The switchable liquid crystal-based devices are preferably electrically controllable, for switching between at least a first and second state. In the first state, when no voltage is applied, the switchable liquid crystal-based device acts as a planar plate, and a beam passing it is not significantly changed. On the other hand, when a voltage is applied, the liquid crystal-based device switches to the second state in which it manipulates the input beam and provides an altered output beam. In the second state, the emitted light may for instance be changed from a "spot" light beam with a relatively narrow angular distribution to a "flood" light beam with a relatively broad angular distribution, i.e. a wider beam shape. By supplying intermediate voltages, intermediate states may be provided. When in the second and intermediate states, the switchable liquid crystal-based devices are in beam shape altering mode. When not in beam shape altering mode, the beam shape remains virtually unchanged. An example of a switchable liquid crystal-based device suitable for use in the light output device of the present invention is disclosed per se in WO2005121641.

Thus, the invention is based on the understanding that switchable liquid crystal-based devices can be used to dynamically manipulate the output beam shapes of light emitted from light source units embedded in laminated glass. The manipulation, e.g. more or less collimation, may be achieved without mechanical movements. One switchable liquid crystal-based device may be provided for each light source unit for refined control of the overall beam shape, and the switchable liquid crystal-based devices are preferably arranged in front of the light source units. Further, the switchable liquid crystal-based devices may be relatively thin, making them suitable for use in the likewise thin laminated glass structure.

Preferably, the switchable liquid crystal-based devices are selectively or individually addressable, that is, they can be controlled independently so that any number of the liquid crystal-based devices can be switched at a given moment. For instance, the light originating from some light source units may be flooded (wide), while the light emitted by other light source units may be more collimated. This provides for a versatile and applicable light output device. For example, different objects lighted up by the light output device may be illuminated with different beam shapes, to emphasize a certain object or objects. In another example, where the light output device comprises light source units of different colors, a certain color may be flooded (voltage to the corresponding liquid crystal-based devices switched on), while another color is more collimated (voltage to the corresponding liquid crystal-based devices switched off), to create various lighting effects. Alternatively, all switchable liquid crystal-based devices may be addressed jointly, to provide a unified lighting effect.

Returning to WO2005121641, the switchable liquid crystal-based device disclosed therein comprises a first (bottom) transparent element having a fixed refraction index and a second, superimposed transparent element having an electrically adaptable refractive index, the second element comprising a liquid crystal layer. By electrically changing the refractive index of the second element, the difference in refraction index of the first and second elements is changed, which in turn influences the angular distribution of light propagating from the first to the second element. Hereto, in an advantageous embodiment of the light output device of the present invention, where the light source units are arranged between a top glass plate and a bottom glass plate of the laminated glass structure, the above first bottom transparent element of the switchable liquid crystal-based devices is formed by said top glass plate. Thus, the switchable liquid crystal-based devices are "partly integrated" with the top glass plate and no dedicated elements having the fixed refractive index are necessary, which may reduce cost and make manufacturing of the light output device more efficient. Alternatively, the switchable liquid crystal-based devices including any fixed refractive index element may be placed outside the laminated glass structure, on top of the top glass plate and aligned with the corresponding light source units. This provides for easy mounting of the switchable liquid crystal-based devices. As yet other alternatives, the liquid crystal-based devices including the elements having the fixed refractive index may be integrated into the top glass plate or placed beneath the top glass plate. The latter two alternatives allow a smooth top surface of the light output device to be maintained.

The light output device may further comprise compound parabolic concentrators (CPCs) for pre-collimating the light emitted by the light source units, i.e. collimate the light before it is manipulated by the switchable liquid crystal-based devices. Preferably, one CPC is provided for each light source unit/switchable liquid crystal-based device. The longer the CPC, the more pre-collimation.

Each light source unit preferably comprises one or more light emitting diodes (LEDs). For instance, each light source unit may comprise a single LED (e.g. white or monochromatic) or several LEDs (e.g. R, G, B or R, G, B, A). LEDs are beneficial from many points of view, for instance power efficiency and long lifetime. Instead of LEDs, other appropriate light sources could be used, such as other semiconductor light sources (e.g. laser diodes). Also, the color of the light source units may be the same or different throughout the light output device, as indicated above.

The light output device may be an illumination device, where the output level of the device is such that the light emitted from the device may illuminate an object, that is, the output level is high enough.

According to another aspect of the present invention, there is provided a method for controlling the output of a light output device according to the above aspect, the method comprising the step of switching at least one of the switchable liquid crystal-based devices to the beam shape altering mode. In this way, the beam shape of light emitted by the light source unit(s) associated with the liquid crystal-based devices which are switched to the beam shape altering mode may be altered. The switching may be performed by supplying appropriate electrical control signals, e.g. appropriate voltages. This aspect exhibits similar advantages as the previously discussed aspect.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1:
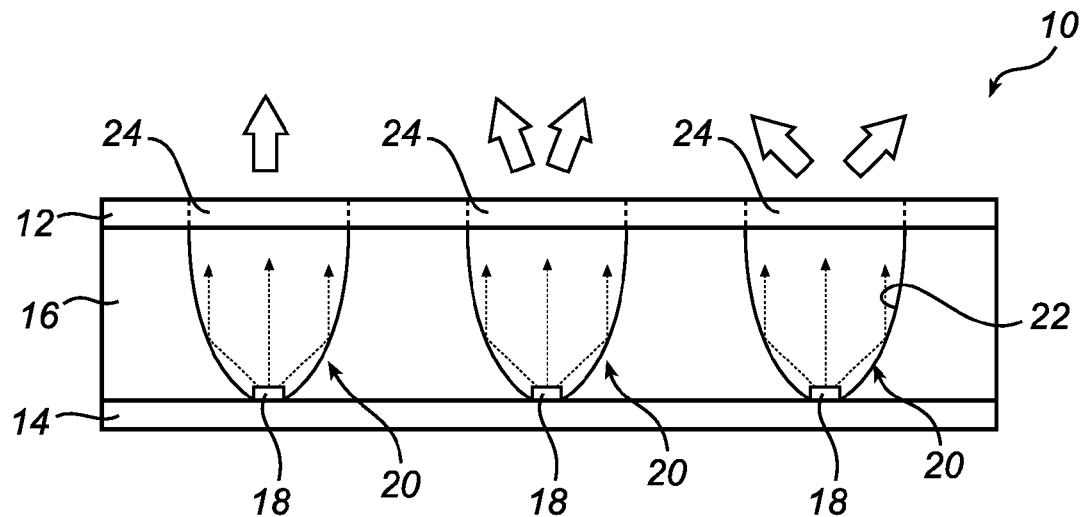
FIG. 1 is a schematic, cross-sectional side view of a light output device according to an embodiment of the present invention.

FIG. 1 is a schematic, cross-sectional side view of a light output device 10 according to an embodiment of the present invention.

The light output device 10 comprises a top glass plate (cover plate) 12 and a bottom glass plate 14. The glass could be transparent or translucent. Between the glass plates 12, 14, an intermediate layer 16 is provided, for instance polyvinylbutyral (PVB). During manufacturing, the two glass plates 12, 14 are bonded with the PVB layer 16 under heat and pressure to create a single laminated glass structure.

In the intermediate layer 16, a plurality of LED units 18 adapted to emit light are arranged side by side at the bottom glass plate. In order to power and control the LED units 18, suitable electrical connections are provided (not shown). Each LED unit 18 may comprise a single LED (e.g. white or monochromatic) or several LEDs (e.g. one red, one green, and one blue LED, or red-green-blue-amber). The latter creates a mixed light. Also, the color of the LED units 18 may be the same or different throughout the light output device 10. For instance, the left LED unit 18 in FIG. 1 may comprise one or more LED dies or chips adapted to emit red light, the middle LED unit 18 may likewise be adapted to emit green light, and the right LED unit 18 may emit blue light during operation.

Each LED unit 18 is arranged at the small end of a compound parabolic concentrator (CPC) 20 extending from the bottom glass plate 14 to the top glass plate 12. The CPCs 20 function in a manner known per se, and serve here to pre-collimate light emitted from the LED units 18 in a general direction along the CPC axis, perpendicular to the plane of the glass plates 12, 14 towards the top plate 12. Hereto, the CPCs 20 may have reflective inner walls 22 (e.g. coated with metal) or may be filled with a dielectric material with high refraction index (higher than PVB).

In front of and aligned with each LED unit 18/CPC 20, there is provided a switchable liquid crystal-based device 24. In FIG. 1, the switchable liquid crystal-based devices 24 are embedded in the top glass plate 12.

Figure 2A:
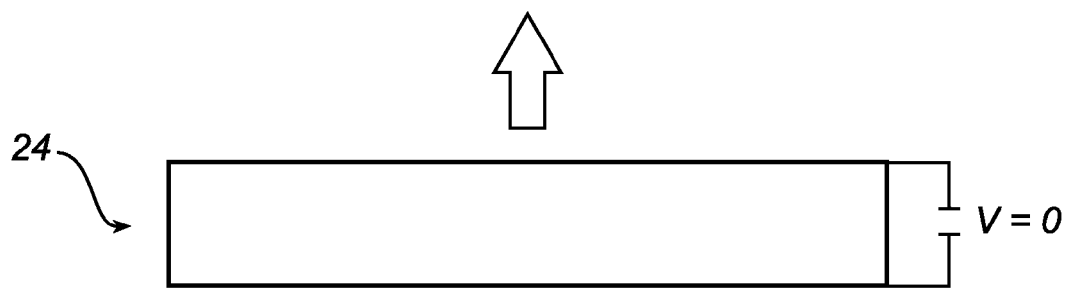
FIGS. 2a-2b schematically illustrate a switchable liquid crystal-based device of the light output device according to the invention.
Figure 2B:
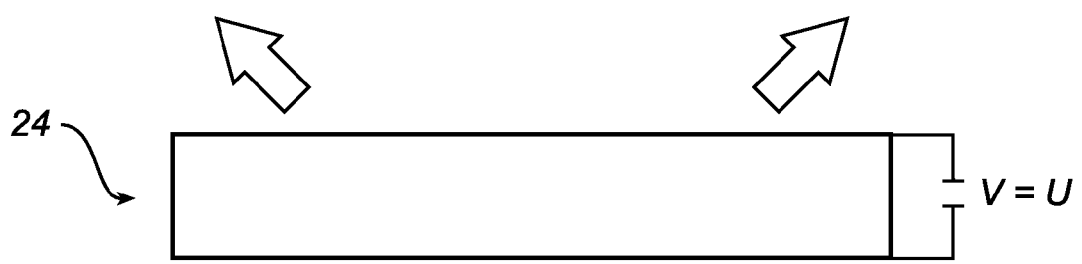

An exemplary switchable liquid crystal-based device 24 is schematically illustrated in more detail in FIGS. 2a-2b. Generally, the liquid crystal-based device 24 is electrically switchable between a first and second state. In the first state (FIG. 2a), no voltage is applied (V=0), and the device acts as a planar plate. In this state, a beam passing the switchable liquid crystal-based device 24 is not significantly changed. For instance, an input collimated beam passing the device 24 remains collimated ("spot" light beam). On the other hand, when a voltage is applied (V=U), the liquid crystal-based device 24 switches to the second state in which it manipulates the input beam and provides an output beam having a different shape. In the second state, the emitted light may for instance be changed from a collimated light beam to a "flood" light beam with a broader angular distribution, i.e. a wider beam shape. The switchable liquid crystal-based device 24 may additionally be set to various intermediate states by applying intermediate voltages (0<V<U), in which states the beam gradually changes (e.g. widens) from the state of FIG. 2a to the state of FIG. 2b, or vice versa.

Returning to FIG. 1, if the LED unit 18 contains one low power LED, i.e. die size of about 0.3 mm×0.3 mm, the size of one switchable liquid crystal-based device 24 is about 1.2 mm×1.2 mm. On the other hand, it a high power LED is used (die size of about 1 mm×1 mm, the size of a corresponding device 24 is about 4 mm×4 mm.

Further, the switchable liquid crystal-based devices 24 are preferably selectively or individually addressable. For instance, the voltage U (or intermediate voltages) may be supplied to selected devices 24 only, resulting in corresponding selective switching of the liquid crystal-based devices 24. Various electrical solutions (not shown) for achieving the selective addressing will be apparent for the skilled person. For instance, structured ITO layers, passive/active-matrix driving could be used.

An exemplary operation of the light output device 10 will now be described. Generally, light emitted by the LED units 18 is pre-collimated by the corresponding CPCs 18. The pre-collimated light then strikes the switchable liquid crystal-based devices 24 and is altered when the devices 24 are in the second or intermediate states ("beam shape altering mode"). The left liquid crystal-based device 24 in FIG. 1 is off (V=0), as in FIG. 2a, whereby the collimated light passes the device 24 without being manipulated. The right liquid crystal-based device 24 in FIG. 1 is on (V=U), as in FIG. 2b, whereby the input beam is changed so that a wider beam is output. The middle liquid crystal-based device 24 in FIG. 1 is set to an intermediate stage (0<V<U), providing an intermediate widening effect for the light passing the device. Thus, the divergence of the output differs from one LED unit 18 to another of the light output device 10. During subsequent operation, the states of the different liquid crystal-based devices 24 may be changed. Thus, in the light output device 10, the output beam shapes may be dynamically manipulated, without any mechanical movement. As discussed above, various driving schemes are possible to achieve different illumination and luminance effects. Such driving schemes are preferably executed by a control unit (not shown) of the light output device 10.

It is also possible to alter the total output of the light output device, e.g. switch between an overall spot light and food light, by jointly addressing all switchable liquid crystal-based devices (e.g. supplying voltage V=U to all devices 24).

Figure 3:
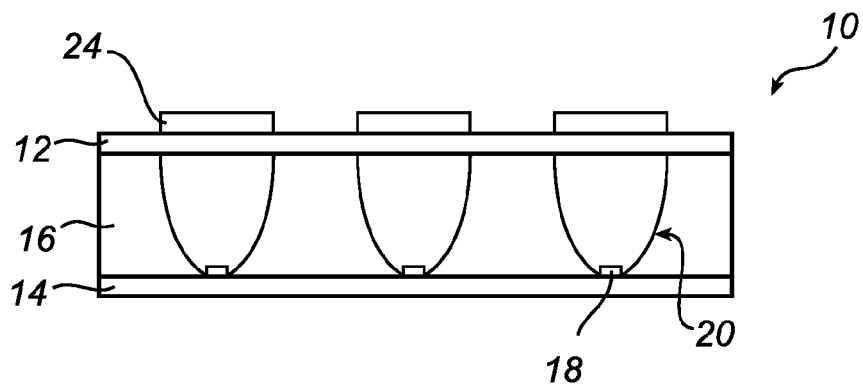
FIGS. 3-6 are schematic, cross-sectional side views of other embodiments of the light output device according to the present invention.

Instead of having the switchable liquid crystal-based devices 24 embedded in the top glass plate 12 as in FIG. 1, the switchable liquid crystal-based devices 24 may be placed outside the laminated glass, on top of the top glass plate 12, as shown in FIG. 3.

Figure 4:
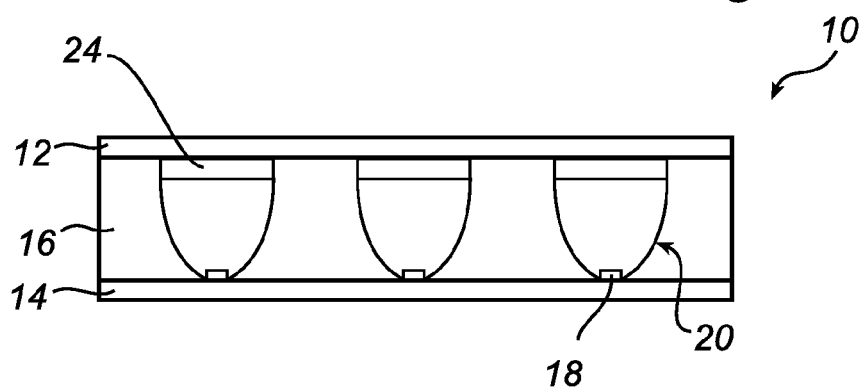
Figure 5:
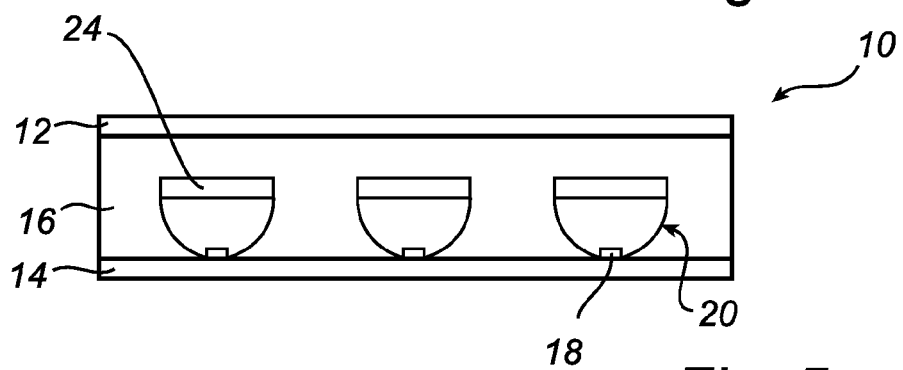

Alternatively, the switchable liquid crystal-based devices 24 can be placed beneath the top glass plate 12, namely in the intermediate layer 16 between the top and bottom plates 12, 14. The switchable liquid crystal-based devices 24 may be placed immediately under the top glass plate 12, as in FIG. 4, or be arranged at an intermediate position in the PVB layer 16, as in FIG. 5. Note that in FIG. 4 the CPC 20 is longer than in FIG. 5. The longer the CPC 20, the more pre-collimation.

Figure 6:
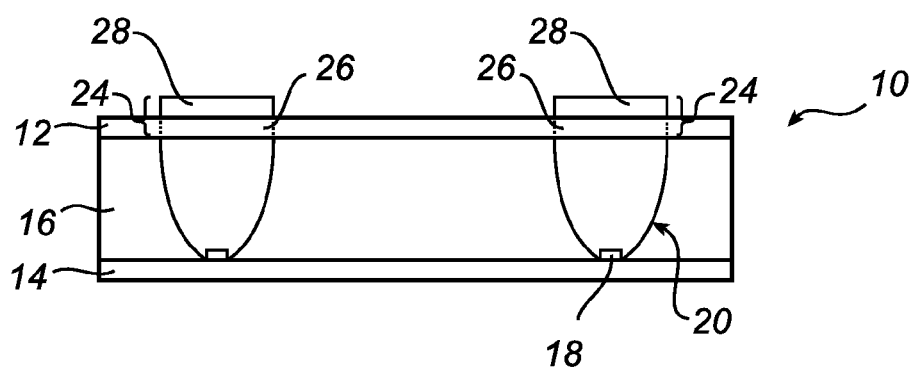

A special embodiment of the light output device of the invention is further disclosed in FIG. 6. Here, the switchable liquid crystal-based devices 24 are of similar type to that disclosed in the above mentioned WO2005121641, comprising a first (bottom) transparent element 26 having a fixed refraction index and a second, superimposed transparent element 28 having an electrically adaptable refractive index, the second element comprising a liquid crystal layer. By electrically changing the refractive index of the second element 28, the difference in refraction index of the first and second elements 26, 28 is changed, which in turn influences the angular distribution of light propagating from the first element 26 to the second element 28. Hereto, instead of each switchable liquid crystal-based device 24 having its own transparent bottom element 26, the top glass plate 12 of the glass structure is used as the transparent bottom elements having the fixed refractive index. In other words, the switchable liquid crystal-based devices 24 are in FIG. 6 "partly integrated" with the top glass plate 12, but without significant intervention of the top plate 12.

Applications of the light output device according to the invention include general and specific illumination and lighting, both indoor and outdoor, such as retail lighting, office lighting, healthcare lighting, decorative lighting, architectural lighting, etc.

The person skilled in the art realizes that the present invention by no means is limited to the preferred embodiments described above. On the contrary, many modifications and variations are possible within the scope of the appended claims. For example, other switchable liquid crystal-based devices other than that referred to in WO2005121641 may be used, such as that of WO2006043196. Also, the laminated glass may contain additional glass layers and intermediate layer. Also, instead of CPSc, other means for pre-collimating or shaping the light emitted by the light source units could be used.

The invention claimed is:

1. A light output device, comprising:
   a plurality of light source units arranged in a laminated glass structure for emitting light, wherein the light source units are arranged between a top glass plate and a bottom glass plate bonded to form the laminated glass structure,
   a plurality of compound parabolic concentrators for pre-collimating the light emitted by the light source units, and
   a plurality of switchable liquid crystal-based devices arranged to alter the beam shapes of light emitted by the light source units, wherein the top glass plate forms a transparent element, having a fixed refractive index, of each switchable liquid crystal-based device.

2. A light output device according to claim 1, wherein the switchable crystal-based devices are selectively addressable.

3. A light output device according to claim 1, wherein each light source unit comprises one or more light emitting diodes (LEDs).

* * * * *